(12) United States Patent
Hanamoto et al.

(10) Patent No.: US 7,945,118 B2
(45) Date of Patent: May 17, 2011

(54) IMAGE PROCESSING APPARATUS AND CONTROL METHOD THEREOF

(75) Inventors: Takashi Hanamoto, Kawasaki (JP); Kiyoshi Kusama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 956 days.

(21) Appl. No.: 11/781,471

(22) Filed: Jul. 23, 2007

(65) Prior Publication Data
US 2008/0025622 A1 Jan. 31, 2008

(30) Foreign Application Priority Data

Jul. 28, 2006 (JP) ................................ 2006-207168

(51) Int. Cl.
*G06K 9/32* (2006.01)
*G06K 9/40* (2006.01)

(52) U.S. Cl. ........ 382/298; 382/266; 382/260; 382/299; 382/300

(58) Field of Classification Search .................. 382/266, 382/260, 298, 299, 300
See application file for complete search history.

(56) References Cited

U.S. PATENT DOCUMENTS

| | | | | |
|---|---|---|---|---|
| 5,319,719 A * | 6/1994 | Nakazawa et al. | ............ | 382/132 |
| 5,717,789 A * | 2/1998 | Anderson et al. | ............. | 382/254 |
| 5,949,915 A * | 9/1999 | Yamada | ........................ | 382/260 |
| 6,046,821 A * | 4/2000 | Curry | .............................. | 358/1.9 |
| 6,307,569 B1 * | 10/2001 | Ratakonda | .................... | 345/671 |
| 6,411,305 B1 * | 6/2002 | Chui | ............................... | 345/660 |
| 6,760,401 B2 * | 7/2004 | Schmitz et al. | ................. | 378/62 |
| 6,782,137 B1 * | 8/2004 | Avinash | ........................ | 382/254 |
| 7,173,732 B2 * | 2/2007 | Matama | ........................ | 358/1.9 |
| 7,177,481 B2 * | 2/2007 | Kaji | ................................ | 382/265 |
| 7,304,768 B2 * | 12/2007 | Takemoto et al. | ............. | 358/1.9 |
| 7,437,020 B2 * | 10/2008 | Yi | ................................... | 382/300 |
| 7,668,390 B2 * | 2/2010 | Hier | .............................. | 382/260 |
| 2003/0189579 A1 * | 10/2003 | Pope | ............................. | 345/660 |
| 2007/0086671 A1 * | 4/2007 | Kaji | ............................... | 382/260 |

FOREIGN PATENT DOCUMENTS

| | | |
|---|---|---|
| JP | 2003-141532 | 5/2003 |
| JP | 2003-274157 | 9/2003 |

* cited by examiner

*Primary Examiner* — Bhavesh M Mehta
*Assistant Examiner* — Utpal Shah
(74) *Attorney, Agent, or Firm* — Cowan, Liebowitz & Latman, P.C.

(57) ABSTRACT

This invention makes it possible to obtain an enlarged image while suppressing noise and maintaining the sharpness of an original image only by setting a simple enlargement ratio without no special knowledge. Original image data (Ia) is enlarged in accordance with a set enlargement ratio (E) to generate an enlarged image (IA). The enlarged image (IA) is smoothed by using a smoothing filter with a size depending on the enlargement ratio (E) to generate smoothed image data (IB). Difference image data (IC) is generated by calculating the difference between the enlarged image data (IA) and the smoothed image data (IB). The generated difference image data is multiplied by an emphasis coefficient. The product is added to the enlarged image data, thereby obtaining image data (IS) that has undergone enlargement/unsharp masking.

4 Claims, 17 Drawing Sheets

FIG. 2A

| Ia(x-1, y-1) | Ia(x, y-1) | Ia(x+1, y-1) |
|---|---|---|
| Ia(x-1, y) | Ia(x, y) | Ia(x+1, y) |
| Ia(x-1, y+1) | Ia(x, y+1) | Ia(x+1, y+1) |

SMOOTHING FILTER

FIG. 2B

| Ia(x-2, y-2) | Ia(x-1, y-2) | Ia(x, y-2) | Ia(x+1, y-2) | Ia(x+2, y-2) |
|---|---|---|---|---|
| Ia(x-2, y-1) | Ia(x-1, y-1) | Ia(x, y-1) | Ia(x+1, y-1) | Ia(x+2, y-1) |
| Ia(x-2, y) | Ia(x-1, y) | Ia(x, y) | Ia(x+1, y) | Ia(x+2, y) |
| Ia(x-2, y+1) | Ia(x-1, y+1) | Ia(x, y+1) | Ia(x+1, y+1) | Ia(x+2, y+1) |
| Ia(x-2, y+2) | Ia(x-1, y+2) | Ia(x, y+2) | Ia(x+1, y+2) | Ia(x+2, y+2) |

SMOOTHING FILTER

FIG. 4

| E : IMAGE ENLARGEMENT RATIO | FILTER SIZE | EMPHASIS COEFFICIENT TABLE |
|---|---|---|
| 1.0 < E < 2.0 | 3×3 | TABLE 301 |
| 2.0 ≦ E < 5.0 | 5×5 | TABLE 302 |
| 5.0 ≦ E | 7×7 | TABLE 303 |

FIG. 15

| PROCESSING POWER OF CPU / USABLE MEMORY SIZE | LOW | MEDIUM | HIGH |
|---|---|---|---|
| SMALL | HARDWARE RESOURCES = SMALL | HARDWARE RESOURCES = SMALL | HARDWARE RESOURCES = SMALL |
| MEDIUM | HARDWARE RESOURCES = MEDIUM | HARDWARE RESOURCES = LARGE | HARDWARE RESOURCES = LARGE |
| LARGE | HARDWARE RESOURCES = MEDIUM | HARDWARE RESOURCES = LARGE | HARDWARE RESOURCES = LARGE |

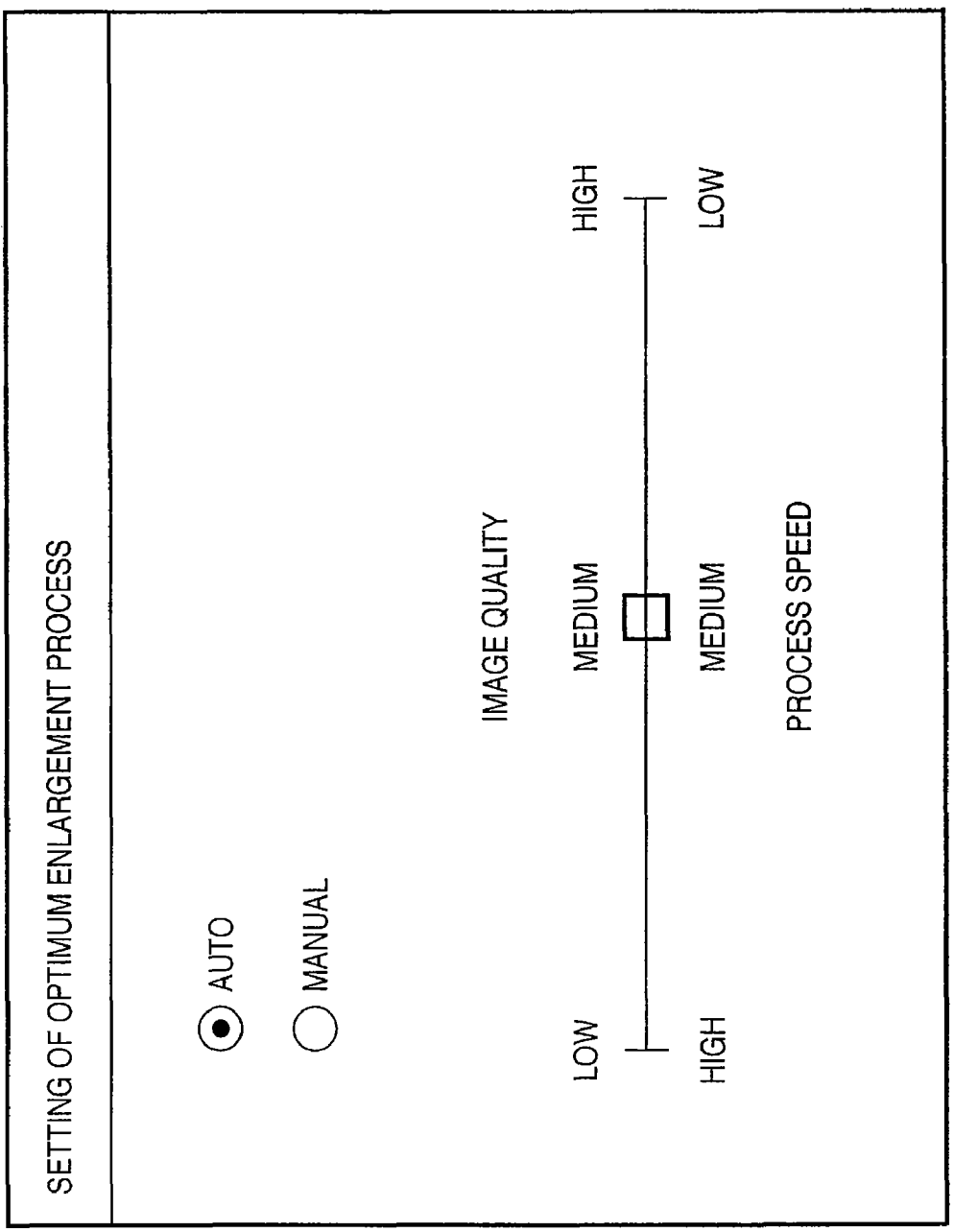

IMAGE PROCESSING APPARATUS AND CONTROL METHOD THEREOF

BACKGROUND OF THE INVENTION

1. Field of the Invention

The present invention relates to an image enlargement technique.

2. Description of the Related Art

Unsharp masking is a process of emphasizing the edge portion of an image. This designation derives from the presence of image data smoothing included in a process of emphasizing the edge.

In unsharp masking, smoothing is executed for original image data Ia as a process target to generate a smoothed image Ib. Smoothing is a process of averaging a pixel of interest and neighboring pixels around it by using a smoothing filter 201 as shown in FIG. 2A and changing the value of the pixel of interest, thereby shading the image. Image data Is with improved sharpness is generated based on the smoothed image data Ib and original image data Ia. These images hold a relationship given by $$Is = Ia + \alpha(Ia - Ib) \quad (1)$$

Equation (1) will be described briefly. An edge component (i.e., a high-frequency component of an image) is extracted by calculating the difference between the original image Ia and the smoothed image Ib. The edge component is emphasized by multiplying it by an emphasis coefficient $\alpha$. Then, the emphasized edge component is added to the original image Ia, thereby obtaining the image data Is with improved sharpness.

The print resolutions of printing apparatuses are steadily rising recently. A print resolution indicates the number of pixels per unit length (or unit area). To print by using a printing apparatus having a high print resolution, the number of pixels of image data also needs to increase. That is, a print target image needs to be large, the resultant image data Is of equation (1) is generally enlarged as needed.

However, if the image data that has undergone unsharp masking is enlarged, the specially emphasized edge portion smoothes, resulting in little effect of unsharp masking.

A technique is known which executes unsharp masking by setting the emphasis coefficient $\alpha$ of equation (1) in accordance with the image enlargement ratio and then enlarges the image (e.g., Japanese Patent Laid-Open No. 2003-141532). This reference also discloses another method which enlarges an image first and then executes edge emphasis by using the emphasis coefficient $\alpha$ with a large value.

In the above-described technique, if an image is enlarged after edge emphasis, the edge smoothes, resulting in noticeable image degradation. Even when edge emphasis is done after enlargement, the smoothing effect deteriorates because the edge area of the enlarged image is large. For these reasons, it is difficult to emphasize the edge portion only by making the emphasis coefficient $\alpha$ large. Conversely, the process uselessly emphasizes parts other than the edge portion, and noise in the image increases.

To cope with an increase in edge area, a method of increasing the size of a filter for edge detection of an enlarged image is known (e.g., Japanese Patent Laid-Open No. 2003-274157), although this technique is not related to unsharp masking. According to this reference, a smoothing filter with a larger size can cope with an increase in edge area. However, parts other than the edge area are also emphasized, and noise in the image increases because of the enhanced smoothing effect.

SUMMARY OF THE INVENTION

The present invention has been made in consideration of the above-described problems and executes, in image enlargement, unsharp masking for an enlarged image as much as possible instead of enlarging an image that has undergone edge emphasis by unsharp masking. The present invention thus provides a technique of generating an enlarged image while suppressing noise and maintaining the sharpness of an original image by a simple operation without any special knowledge.

To solve the above-described problems, an image processing apparatus of the present invention has, e.g., the following arrangement.

There is provided an image processing apparatus which generates enlarged image data by increasing the number of pixels of original image data in accordance with an enlargement ratio, comprising:

an enlargement ratio setting unit adapted to set the enlargement ratio;

an image enlargement unit adapted to enlarge the original image data in accordance with the set enlargement ratio;

a smoothing unit adapted to smooth the enlarged image data generated by the image enlargement unit by using a smoothing filter having a size corresponding to the set enlargement ratio;

a difference image generation unit adapted to generate difference image data by calculating a difference between the enlarged image data and smoothed image data obtained by the smoothing unit; and an output image generation unit adapted to generate output enlarged image data on the basis of the difference image data generated by the difference image generation unit and the enlarged image data obtained by the image enlargement unit.

According to the present invention, it is possible to obtain an enlarged image while suppressing noise and maintaining the sharpness of an original image only by setting a simple enlargement ratio without any special knowledge.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B are views showing examples of smoothing filters;

FIG. 4 is a table for calculating a filter size and an emphasis coefficient table from an enlargement ratio;

FIG. 15 is a view showing a table for hardware resource determination according to the fourth embodiment;

FIG. 17 is a view showing a GUI for optimum enlargement setting according to the fifth embodiment.

DESCRIPTION OF THE EMBODIMENTS

The embodiments of the present invention will be described below in detail with reference to the accompanying drawings. An assumption will be described first.

Letting Ia be an original image, Ib be an image obtained by smoothing the original image Ia, and Is be an image that has undergone unsharp masking, equation (1) described above is obtained. The image Is obtained by unsharp masking is enlarged (interpolated) by a bi-linear method in accordance with an enlargement ratio E, thereby obtaining an image IS. The relationship between IS and Is is given by $$IS=E(Is)=E(Ia+\alpha(Ia-Ib)) \quad (2)$$

where $E(x)$ indicates increasing the number of horizontal pixels and the number of vertical pixels of an image x to E times. The smoothed image Ib is obtained by using a smoothing filter f for the original image Ia. When Ib is replaced with "f(Ia)" to explicitly indicate it, equation (2) is rewritten to $$IS=E(Is)=E(Ia+\alpha \cdot (Ia-f(Ia))) \quad (2)'$$

With this image process, the image is smoothed by enlargement, eventually resulting in little unsharp masking effect. To cope with this, an emphasis coefficient α needs to have a larger value, assuming enlargement. However, a larger value than necessary inevitably generates noise and degrades the image quality. Additionally, an inexperienced user repeatedly executes operations of unsharp masking and operations of enlargement to determine the optimum coefficient α and the filter size for smoothing. This requires a long time to obtain an image with a desired quality.

In the present invention, however, a user only needs to do an operation to execute enlargement and unsharp masking and can also obtain enlarged image data without degradation in image quality.

Although details will be described later, the first embodiment generates the image IS that has undergone enlargement/unsharp masking by $$IS=E(Ia)+\alpha \cdot (E(Ia)-F(E(Ia),E)) \quad (3)$$

where $F(x,E)$ indicates smoothing the image x by using a smoothing filter F determined by the enlargement ratio E.

Figure 12:
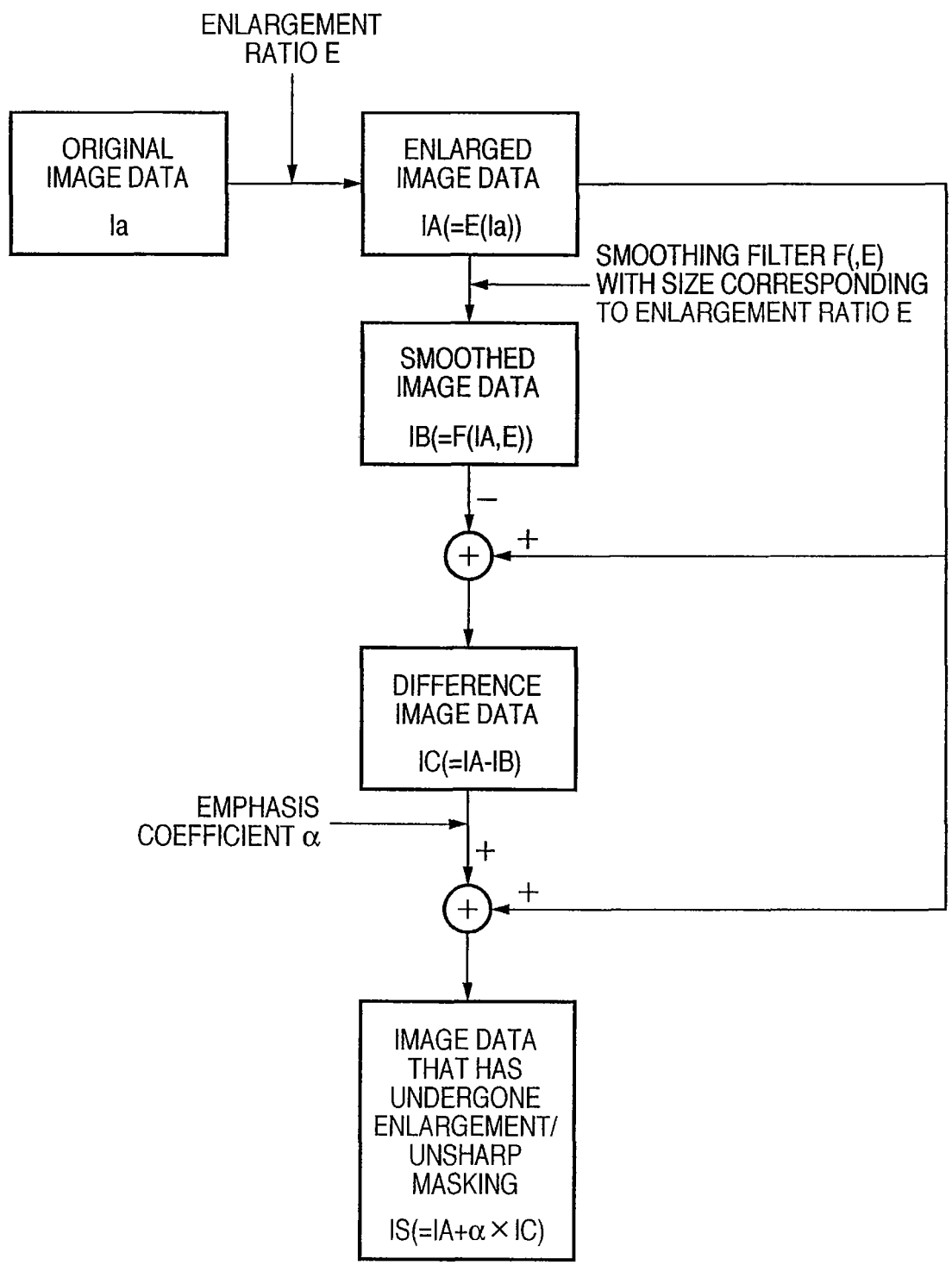
FIG. 12 is a view for explaining the outline of enlargement/unsharp masking according to the first embodiment.

FIG. 12 is a conceptual view of the flow and process of image data according to equation (3).

First, the original image data Ia is enlarged in accordance with the enlargement ratio E to obtain enlarged image data IA. The enlarged image data IA corresponds to E(Ia) of equation (3). The enlarged image data IA is smoothed by using the smoothing filter F(,E) with a size determined by the enlargement ratio E to obtain smoothed image data IB. The smoothed image data IB corresponds to F(E(Ia),E) of equation (3). The differences of pixels between the enlarged image data IA and the smoothed image data IB are calculated to obtain difference image data IC. The difference image data IC corresponds to "E(Ia) −F(E(Ia),E)" of equation (3).

The value of each pixel of the difference image data IC is multiplied by the emphasis coefficient α. The products are added to the values of corresponding pixels in the enlarged image data IA, thereby obtaining the image IS that has undergone enlargement/unsharp masking.

The second embodiment obtains the image IS that has undergone enlargement/unsharp masking by $$IS=E(Ia)+\alpha \cdot (E(Ia)-E(f(Ia)) \quad (4)$$

Figure 13:
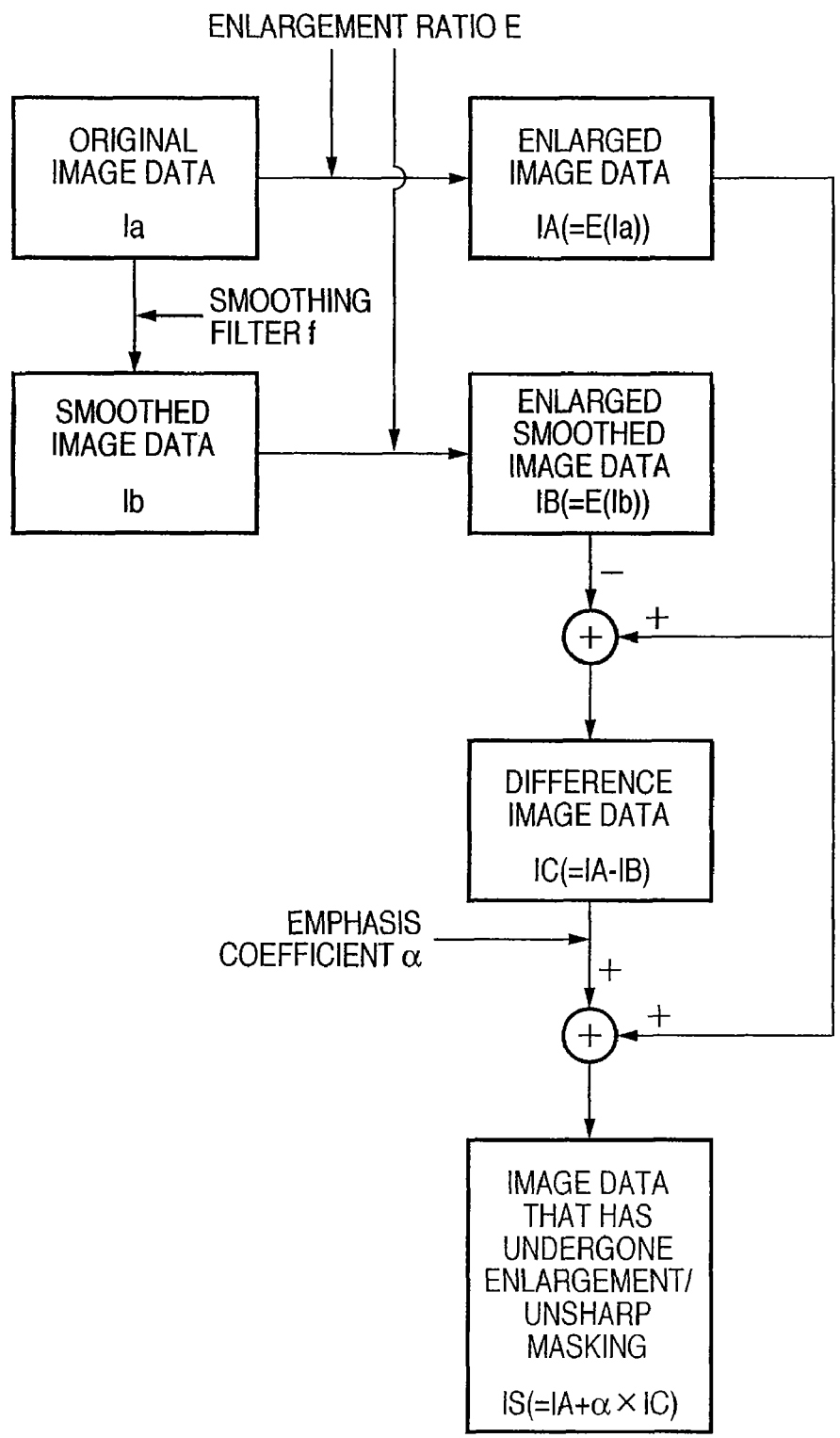
FIG. 13 is a view for explaining the outline of enlargement/unsharp masking according to the second embodiment.

FIG. 13 is a conceptual view of the flow and process of image data according to equation (4).

First, the original image data Ia is smoothed by using the average smoothing filter f based on, e.g., the size of the original image data Ia to obtain the smoothed image data Ib. The smoothed image data Ib corresponds to f(Ia) of equation (4).

Each of the original image data Ia and smoothed image data Ib is enlarged in accordance with the enlargement ratio E to obtain the enlarged image data IA and enlarged smoothed image data IB. The enlarged image data IA corresponds to E(Ia) of equation (4). The enlarged smoothed image data IB corresponds to F(f(Ia)) of equation (4).

The differences of pixels between the enlarged image data IA and the enlarged smoothed image data IB are calculated to obtain the difference image data IC.

The difference image data IC corresponds to "E(Ia)−E(f (Ia))" of equation (4).

The value of each pixel of the difference image data IC is multiplied by the emphasis coefficient α. The products are added to the values of corresponding pixels in the enlarged image data IA, thereby obtaining the image IS that has undergone enlargement/unsharp masking.

The third embodiment obtains the image IS that has undergone enlargement/unsharp masking by $$IS=IA+\alpha \cdot E(Ia-f(Ia)) \quad (5)$$

Figure 14:
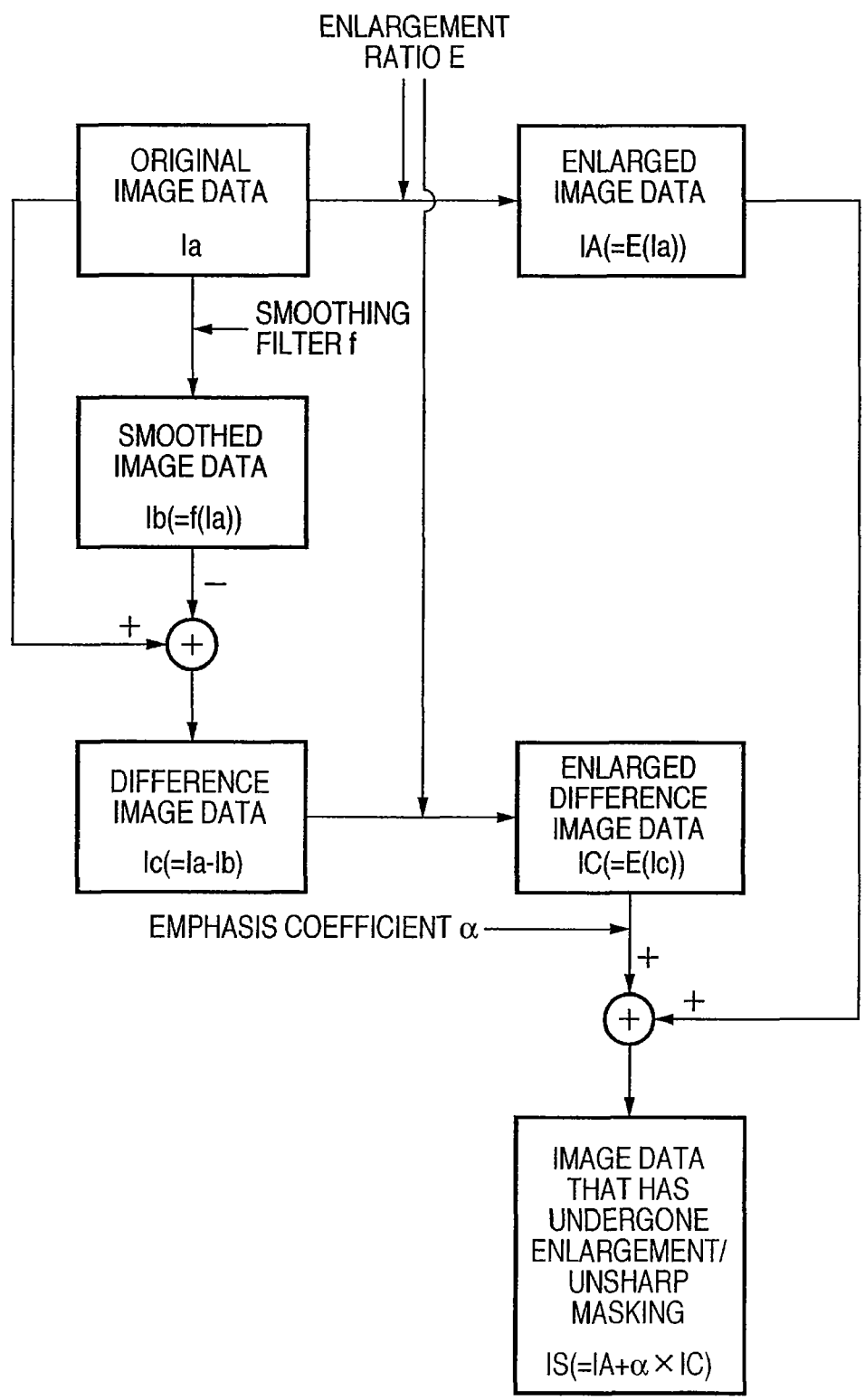
FIG. 14 is a view for explaining the outline of enlargement/unsharp masking according to the third embodiment.

FIG. 14 is a conceptual view of the flow and process of image data according to equation (5).

First, the original image data Ia is smoothed by using the average smoothing filter f based on, e.g., the size of the original image data Ia to obtain the smoothed image data Ib. The smoothed image data Ib corresponds to f(Ia) of equation (5).

The differences of corresponding pixels between the original image data Ia and the smoothed image data Ib are calculated to obtain difference image data Ic.

Each of the original image data Ia and difference image data Ic is enlarged in accordance with the enlargement ratio E to obtain the enlarged image data IA and enlarged difference image data IC. The enlarged image data IA corresponds to E(Ia) of equation (5). The enlarged difference image data IC corresponds to "E(Ia−f(Ia))" of equation (5).

The value of each pixel of the difference image data IC is multiplied by the emphasis coefficient α. The products are added to the values of corresponding pixels in the enlarged image data IA, thereby obtaining the image IS that has undergone enlargement/unsharp masking.

<Description of Apparatus Arrangement>

Common items of the embodiments will be described.

Figure 1:
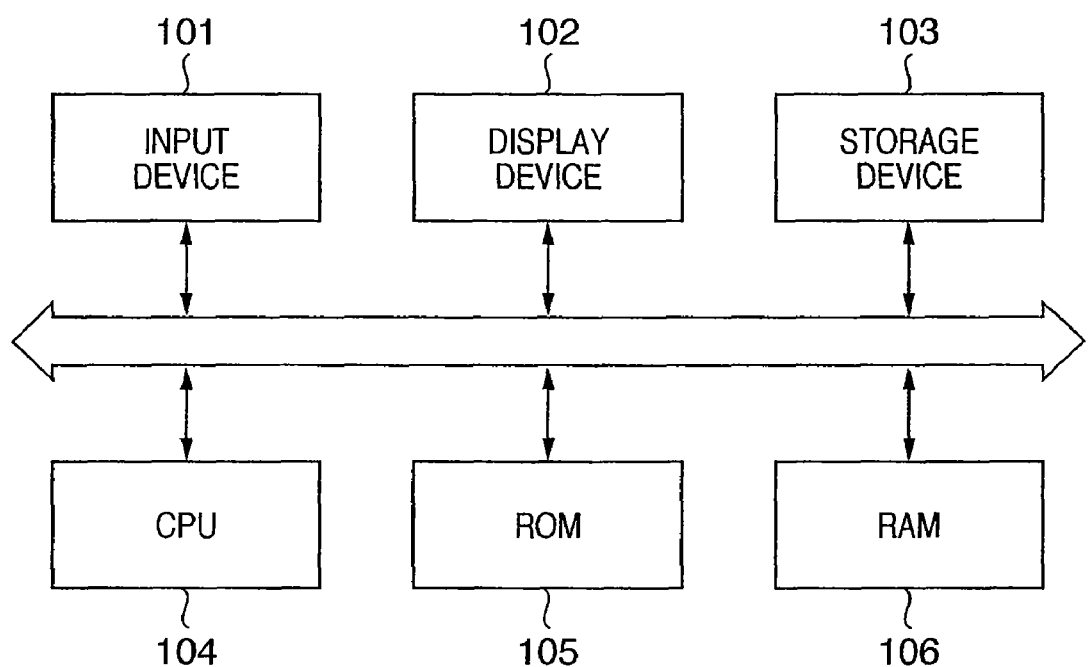
FIG. 1 is a block diagram of a system according to the present invention.

FIG. 1 shows a system configuration according to the present invention. The image processing apparatus comprises, e.g., a personal computer. Referring to FIG. 1, the apparatus includes an input device 101 such as a keyboard and a mouse, a display device 102, and a mass storage device 103 such as a hard disk drive. The storage device 103 stores an OS (Operating System), application programs to be described in the embodiments, and image data files. A CPU 104 controls the entire apparatus. A ROM 105 stores a BIOS and a boot program. A RAM 106 serves as a work area of the CPU 104.

When the apparatus is powered on, the CPU 104 functions as an information processing apparatus by starting a process in accordance with the boot program in the ROM 105, loading the OS from the storage device 103 to the RAM 106 and executing it. The user inputs an activation instruction of an image processing application by operating the input device 101. The CPU 104 loads the application program from the storage device 103 to the RAM 106 and executes it. Consequently, the apparatus functions as an image processing apparatus.

When the application is activated, and the user designates a desired image file in the storage device 103, the CPU 104 reads out the designated image file from the storage device 103 to the RAM 106 and displays it on the display device 102.

Figure 7:
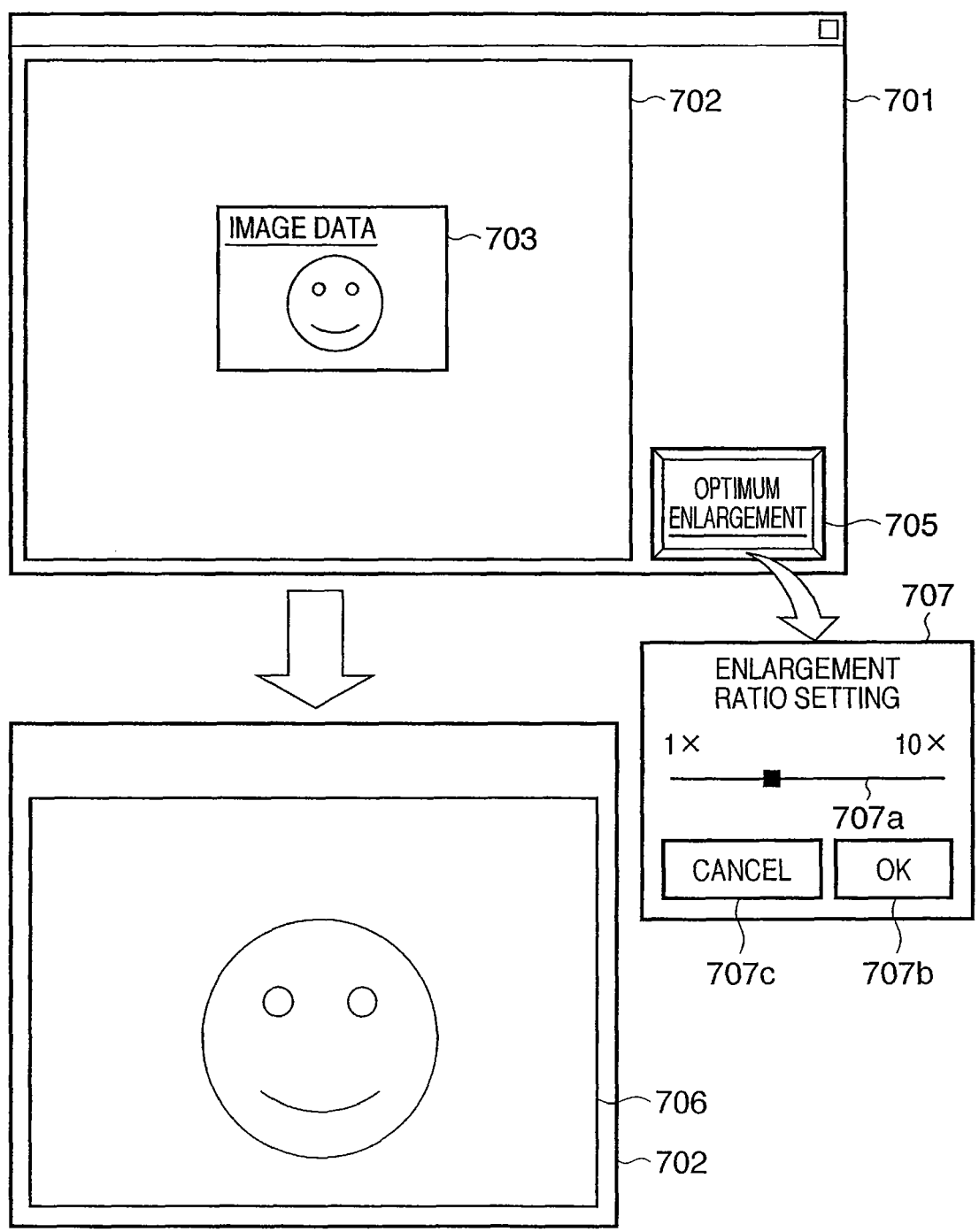
FIG. 7 is a view showing changes in GUI of an application program according to the embodiment.

FIG. 7 shows a GUI displayed on the display device 102 upon reading out an image file. As shown in FIG. 7, the application displays a window 701 having an image display area 702 and an optimum enlargement button 705. There are many kinds of image editing processes in addition to enlargement, although they are not illustrated.

In the example shown in FIG. 7, an enlargement target image 703 is displayed in the image display area 702. When the user designates the optimum enlargement button 705 by operating the input device 101, the CPU 104 displays a dialog box 707 shown in FIG. 7 to set an enlargement ratio. The dialog box includes a slider bar 707a to set an enlargement ratio, an OK button 707b, and a cancel button 707c. The slider bar 707a in FIG. 7 can set an enlargement ratio from 1× to 10×. The user sets a desired enlargement ratio by operating the slider bar 707a. When the user designates the OK button 707b, the dialog box 707 disappears, and enlargement/unsharp masking to be described later is executed. When the user designates the cancel button 707c, the dialog box 707 simply disappears to restore the state before the optimum enlargement button 705 is designated. In the above-described example, the user sets an enlargement ratio by using the slider bar. Instead, the user may input a numerical value as an enlargement ratio by operating the keyboard. That is, an arrangement of any type is usable to set an enlargement ratio.

Figure 8:
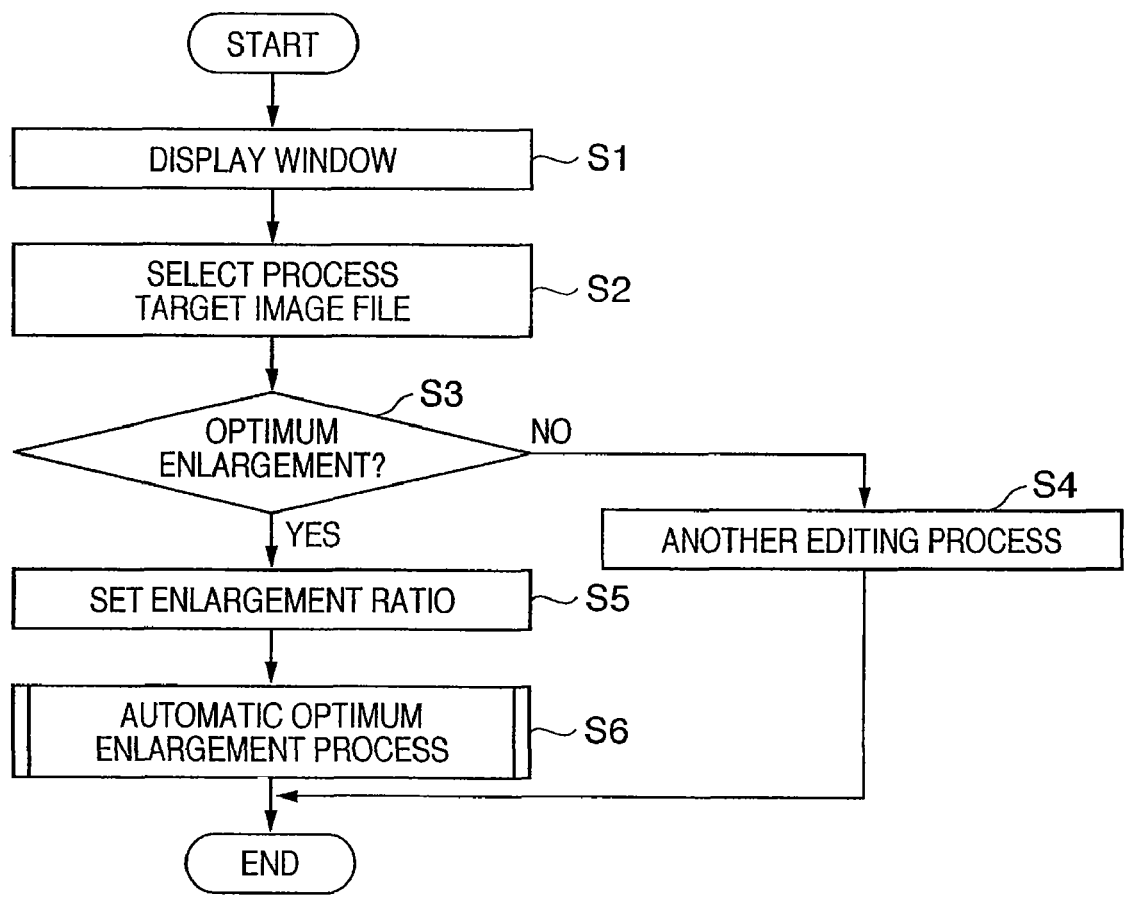
FIG. 8 is a flowchart illustrating the main process of the application program according to the embodiment.

FIG. 8 is a flowchart illustrating the main process procedure of the application program. The CPU 104 executes the steps.

The CPU 104 displays the window shown in FIG. 7 in step S1 and waits until the user selects an editing target image file in step S2. To select an image file, a dialog box for file selection is displayed. The user designates a target file from the input device 101. When the user selects a file, the image is displayed in the image display area 702. In step S3, the CPU 104 waits an editing instruction from the user. If the CPU 104 determines that the user's edit instruction is not the optimum enlargement button 705, the process advances to step S4 to execute a corresponding process.

If the CPU 104 determines that the user's edit instruction is the optimum enlargement button 705, the process advances to step S5 to display the dialog box 707 for enlargement ratio setting and to cause the user to set an enlargement ratio. After enlargement ratio setting, if the user designates the OK button in the dialog box 707, the process advances to step S6 to execute an automatic optimum enlargement process. An image that has undergone the automatic optimum enlargement is displayed in the image display area 702 as an image 706.

A supplementary explanation of enlargement used in this embodiment will be done. This embodiment uses a bi-linear method or a bi-cubic method as enlargement.

Figure 11A:
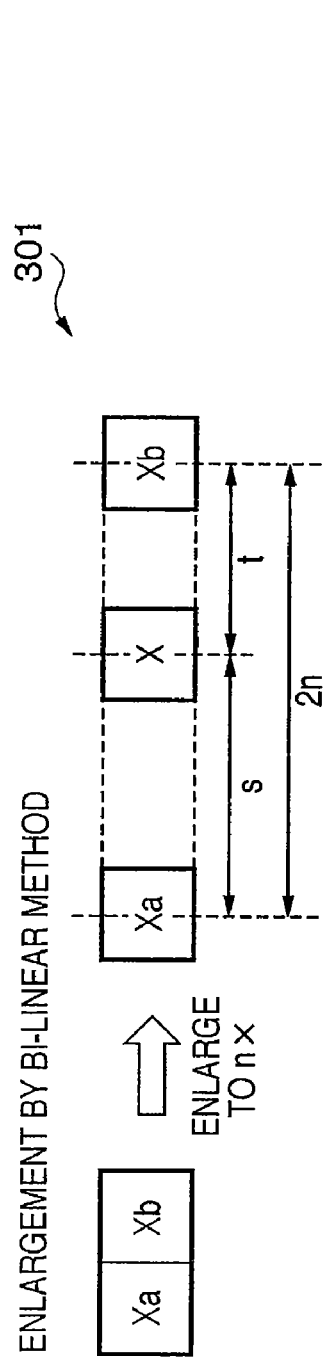
FIGS. 11A and 11B are views for explaining the contents of image enlargement by a bi-linear method and a bi-cubic method, respectively.

FIG. 11A is a view for explaining a linear interpolation method (enlargement method) used in image enlargement. To enlarge an image including two pixels Xa and Xb to n times, (2n−2) interpolation pixels are generated between the two pixels Xa and Xb. Let s be the distance from the pixel Xa, and t be the distance from the pixel Xb. The value of an arbitrary pixel X is given by $$X=(s\times Xa+t\times Xb)/2n$$

Such linear interpolation between two pixels is a linear method. Image data is two-dimensionally interpolated. That is, linear interpolation is executed from four neighboring pixels. A bi-linear method two-dimensionally extends the linear interpolation to 2×2 pixels. As a characteristic of the bi-linear method, the higher the enlargement ratio is, the smoother the whole image becomes. Hence, an effect similar to smoothing can be obtained after enlargement.

Figure 11B:
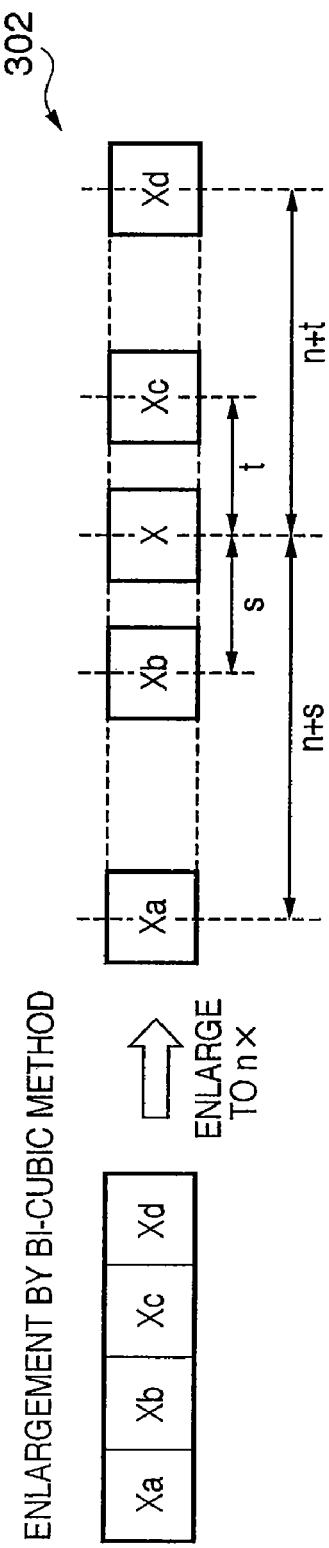

FIG. 11B is a view for explaining a bi-cubic method. In this example, an image including four pixels Xa, Xb, Xc, and Xd is enlarged to n times. In the bi-cubic method, the distance between two existing pixels adjacent in the horizontal (or vertical) direction is defined as "1". In obtaining the value of the pixel X to be generated for interpolation, let d be the distance between the pixel X and a neighboring existing pixel. Cubic(d) is calculated by when 0<|d|<1:

$$Cubic(d)=1-2|d|^2+|d|^3$$

when 1≦|d|<2:

$$Cubic(d)=4-8|d|+5|d|^2-|d|^3$$

when 2≦|d|:

$$Cubic(d)=0$$

Cubic is calculated for the distance between the interpolation pixel X and one of the pixels {Xa, Xb, Xc, Xd}. The sum of Cubic is the interpolation pixel X. That is, in the example shown in FIG. 11B, the interpolation pixel X is calculated by $$X=Cubic(n+s)\times Xa+Cubic(s)\times Xb+Cubic(t)\times Xc+Cubic(n+t)\times Xd$$

Such pixel interpolation in a range wider than linear interpolation is a bi-cubic method. Image data is two-dimensionally interpolated. That is, interpolation is executed from 16 neighboring pixels. The bi-cubic method readily leaves the edge portion of an image as compared to the bi-linear method. Hence, a relatively sharp impression can be obtained even after enlargement.

Three embodiments of the present invention will be described below. Each embodiment has a characteristic feature in the process corresponding to step S6 in FIG. 8. The remaining parts are common.

First Embodiment

In the first embodiment, enlargement/unsharp masking is executed in accordance with equation (3). More specifically, the smoothing filter size and the emphasis coefficient table are switched in accordance with the enlargement ratio of an image. Appropriate unsharp masking is executed for an enlarged image. In the following description, a RAM 106 stores data generated during various kinds of processes.

The sharpness process of the first embodiment is unsharp masking, as described above. In unsharp masking, a smoothed image of an original image is generated. The differences of pixels between the smoothed image and the original image data are calculated. Then, the values are added to the corresponding pixel values in the original image data, thus executing unsharp masking.

The smoothed image is generated by using a 3×3 smoothing filter 201 shown in FIG. 2A.

$Ia(x,y)$ is the pixel value of coordinates $(x,y)$ when the origin $(0,0)$ is set at the upper left corner of the original image data. $Ia(x,y)$ contains R, G, and B components (each having 8 bits). Unless otherwise specified, pixel value calculation is done for each of R, G, and B elements. When the coordinates of the upper left corner of the image data is $(0,0)$, a pixel value $Ib(x,y)$ of the coordinates $(x,y)$ is calculated by $$Ib(x, y) = \qquad (6)$$
$$\{Ia(x-1, y-1) + Ia(x, y-1) + Ia(x+1, y-1) + Ia(x-1, y) +$$
$$Ia(x, y) + Ia(x+1, y) + Ia(x-1, y+1) +$$
$$Ia(x, y+1) + Ia(x+1, y+1)\}/9$$

Next, the difference between an original image Ia and a smoothed image Ib is obtained. A difference value $Ic(x,y)$ is given by $$Ic(x,y)=Ia(x,y)-Ib(x,y) \qquad (7)$$

Let α be the emphasis coefficient. A pixel value $Is(x,y)$ after unsharp masking is calculated by $$Is(x,y)=Ia(x,y)+\alpha \times Ic(x,y) \qquad (8)$$

This calculation is done for all pixels, thereby executing unsharp masking.

A smoothed image can also be generated by switching the size of the smoothing filter. An average value is obtained by using a 5×5 filter like a smoothing filter 202 in FIG. 2B. A 7×7 filter and a 9×9 filter are also usable, although not illustrated. A larger filter capable of smoothing a wider edge portion is useful for an enlarged image. However, a large filter also emphasizes an area other than the edge portion and makes noise in the image data noticeable.

Figure 3:
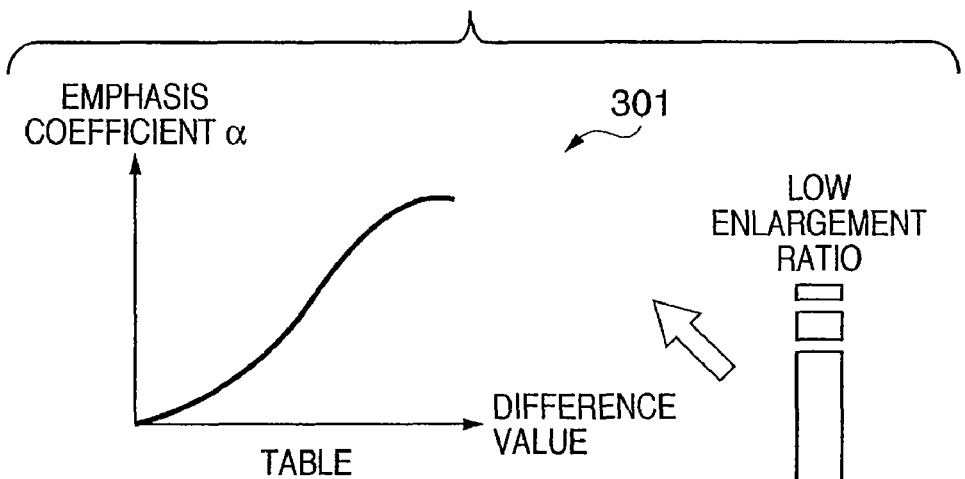
FIG. 3 is a view showing the relationship between enlargement ratios and difference value vs. emphasis coefficient tables.
Figure 3:
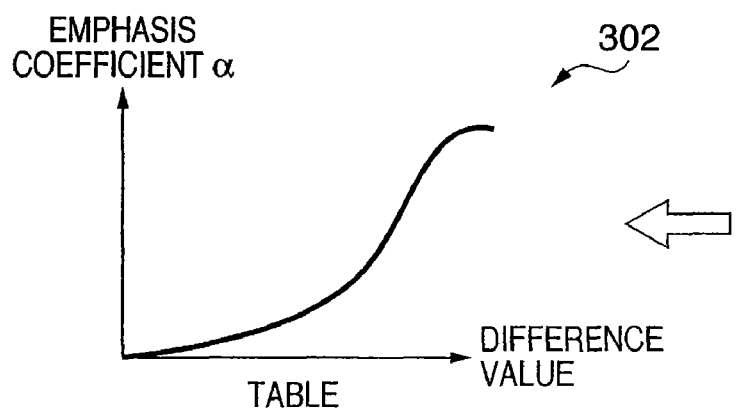
Figure 3:
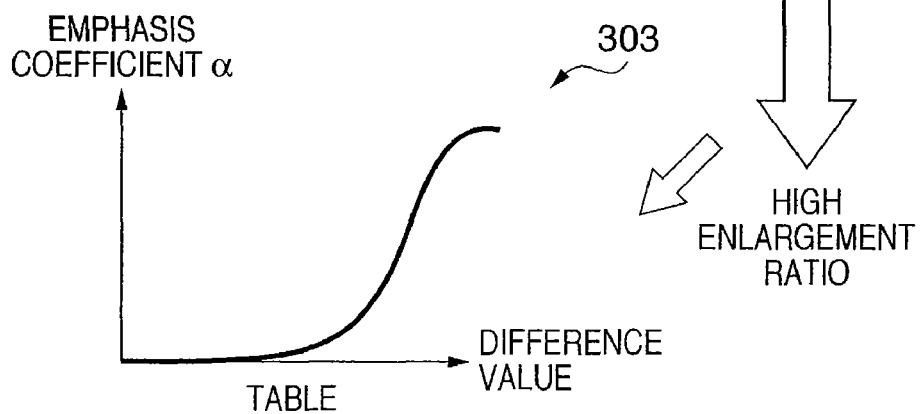

FIG. 3 shows emphasis coefficient tables to reduce noise.

This determines an appropriate emphasis coefficient α in accordance with the difference value $Ic(x,y)$ obtained by equation (7). Each table in FIG. 3 has an abscissa representing the difference value and an ordinate representing the emphasis coefficient α and has a curve characteristic capable of calculating the emphasis coefficient α based on the difference value. As a characteristic feature, the difference value is large at an edge portion and small in an area other than the edge portion. For this reason, when the difference value is small, a small emphasis coefficient is adopted to prevent emphasis of parts other than the edge portion, thereby suppressing noise. When the filter size is large, the difference value becomes large at a part other than the edge portion. Hence, an appropriate emphasis coefficient table is prepared in accordance with the filter size. In FIG. 3, the filter size increases as the image enlargement ratio becomes high. In correspondence with this, this embodiment prepares three coefficient tables 301 to 303 with different curve characteristics. As shown in FIG. 3, as the enlargement ratio rises, the emphasis coefficient becomes smaller in a range where the difference value is small.

A table 401 in FIG. 4 shows how to change the filter size and emphasis coefficient table in accordance with an image enlargement ratio E in the first embodiment. The table 401 is held in the application program. However, it may be saved in a storage device 103 separately as an environment file to be referred to by the application.

As shown in FIG. 4, in the range of 1.0<E<2.0 where E is the image enlargement ratio, the filter size is 3×3, and the table 301 in FIG. 3 is used as the emphasis coefficient table.

In the range of 2.0<E<5.0, the filter size is 5×5, and the table 302 in FIG. 3 is used as the emphasis coefficient table. In the range of 5.0<E, the filter size is 7×7, and the table 303 in FIG. 3 is used as the emphasis coefficient table. Even when the enlargement ratio is 5× or more, the filter size and emphasis coefficient table can be more finely defined. However, if the filter size becomes larger, a very long period of time is required for smoothing. Hence, the table 303 is always used at an enlargement ratio of 5× or more.

In the first embodiment, enlargement and unsharp masking are executed in accordance with equation (3) described above in the above-described way.

Figure 5:
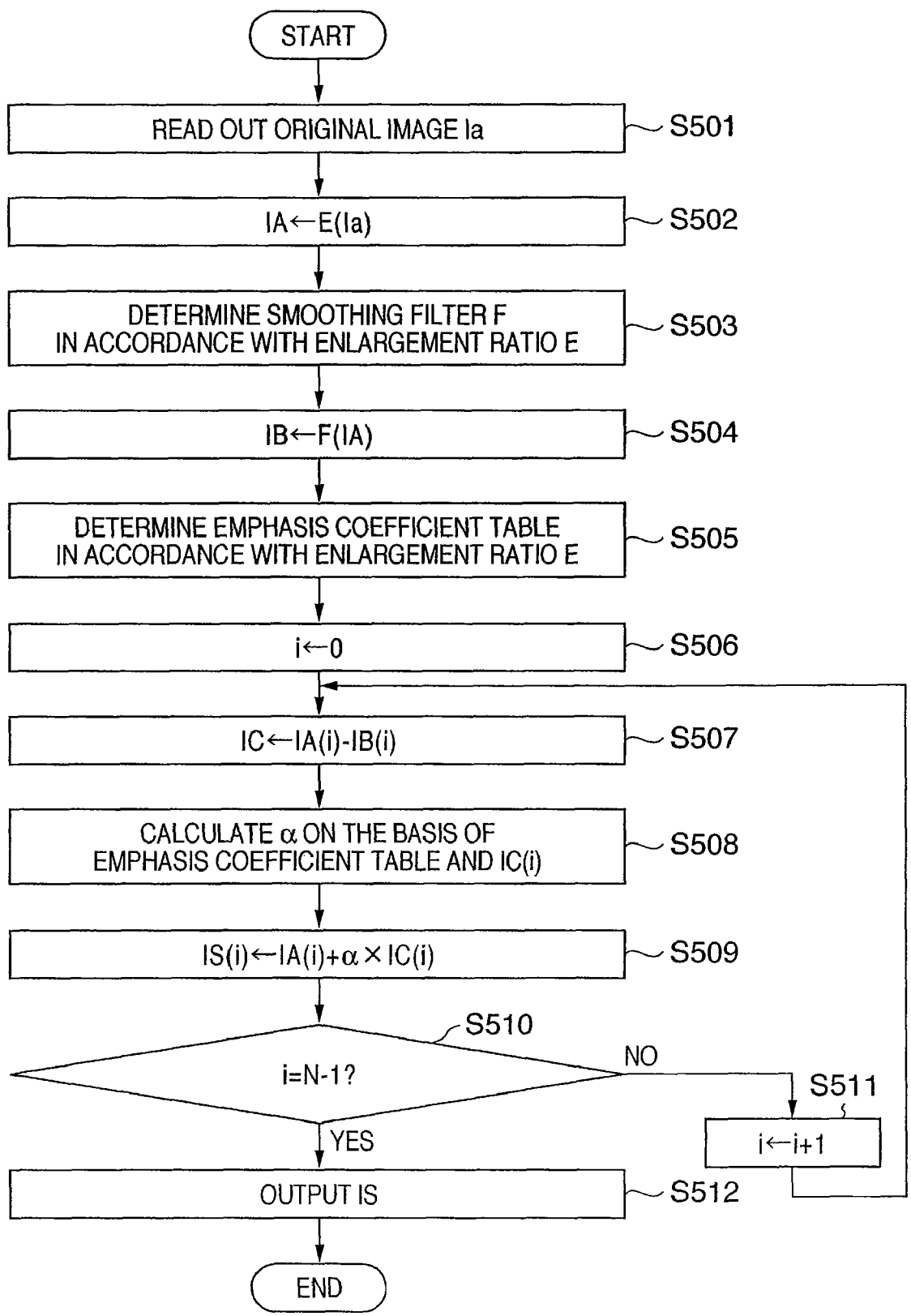
FIG. 5 is a flowchart illustrating the process procedure of enlargement/unsharp masking according to the first embodiment.

FIG. 5 is a flowchart illustrating details of the above-described process in step S6 in FIG. 8 in the first embodiment. Note that the enlargement ratio E has already been set when advancing to step S6, as described above.

In step S501, the original image data Ia (image data selected in step S2 in FIG. 8) is read out. In step S502, the readout image data Ia is enlarged by a bi-linear method at the set enlargement ratio E to generate image data IA. The RAM 106 temporarily stores the generated image data IA. The generated enlarged image data IA corresponds to E(Ia) of equation (3). The image data may be enlarged not by a bi-linear method but by a bi-cubic method.

In step S503, a smoothing filter F having a size corresponding to the enlargement ratio E is determined. In step S504, the generated enlarged image data IA is smoothed by using the smoothing filter F to obtain smoothed image data IB. The RAM 106 temporarily stores the smoothed image data IB, too. The generated smoothed image data IB corresponds to F(E(Ia),E)) of equation (3). In step S505, an emphasis coefficient table is determined based on the enlargement ratio E. An area to store image data IS that has undergone unsharp masking is allocated in the RAM 106.

Figure 6:
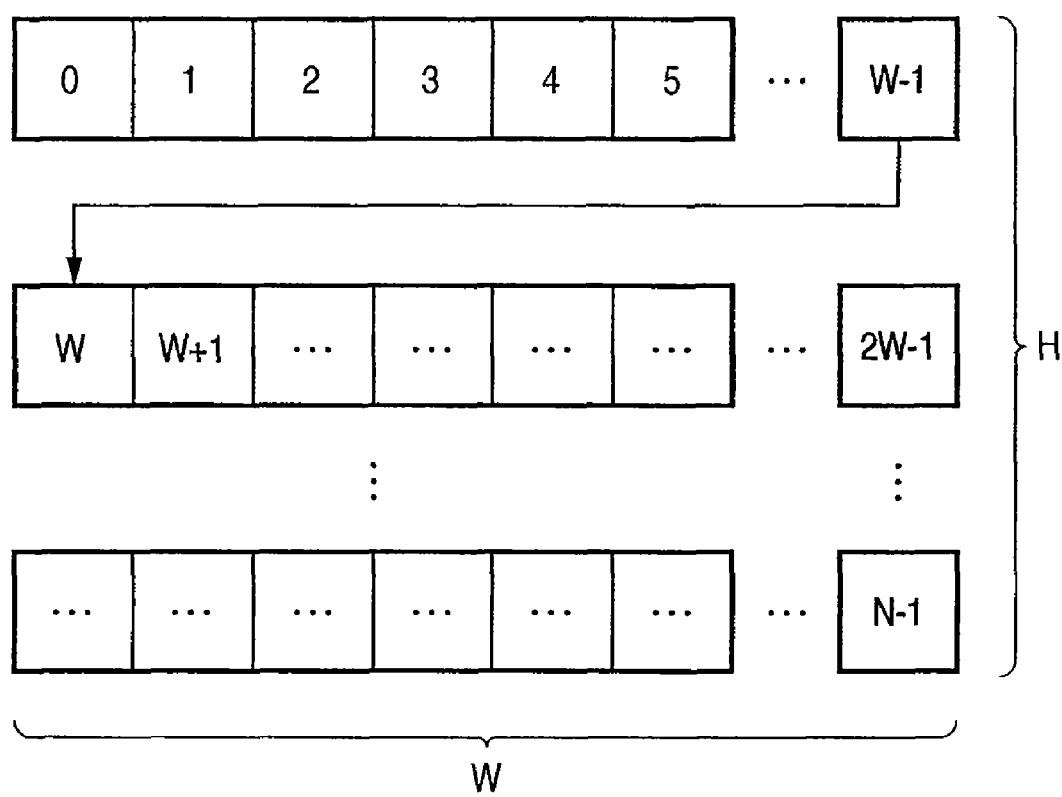
FIG. 6 is a view showing the correlation between an address and an image data scan order.

In step S506, a variable i representing a process target pixel position is initialized to "0". The ith pixel of image data indicates an address value in raster-scanning the image data while defining the upper left pixel as the 0th pixel, as shown in FIG. 6. Let W be the number of pixels in the horizontal direction of the image data, and H be the number of pixels in the vertical direction. The total number N of pixels of the image data is given by W×H. When the coordinates of a pixel of interest are represented by $(x,y)$, $i=x+y \times W$. Since the variable i starts from 0, unsharp masking is executed until the variable equals $(N-1)$.

In step S507, the difference value between the ith pixel value of the image data IA and that of the image data IB is calculated. Let IA(i) be the ith pixel value of the image data IA, and IB(i) be the ith pixel value of the image data IB. The difference image data IC(i) is given by $$IC(i)=IA(i)-IB(i)$$

Each pixel in the image data IA and IB has only a positive value. The difference pixel value of the difference image data IC can also be negative. When each pixel of the original image data is represented by 8 bits, each difference pixel of the difference image data has 9 bits or more to express a negative value.

In step S508, the emphasis coefficient α is calculated based on the difference image data IC(i) and the emphasis coefficient table (one of the tables 301 to 303 in FIG. 3) determined in step S503.

In step S509, the ith pixel value of the image IS that has undergone unsharp masking is calculated by $$IS(i)=IA(i)+\alpha \times IC(i)$$

The calculated pixel value IS(i) is stored at the ith address position of the area allocated in the RAM 106.

In step S510, the variable i is compared with (N−1) to determine whether unsharp masking is executed for all pixels. If the result is NO in step S510, the process advances to step S511 to increment the variable i by "1", and the process from step S507 is repeated.

If it is determined that unsharp masking has ended for all pixels, the process advances to step S512 to output the image data IS that has undergone unsharp masking and has been generated in the RAM 106 to an image display area 702 in FIG. 7. At this time, an area in the RAM 106 that stores other intermediately generated image data, except the image data IS, is released so that the area is usable by the OS for other processes. When a save instruction (not shown) is designated on the application, the image data IS generated in the RAM 106 is saved in the storage device 103 as a file.

As described above, according to the first embodiment, even a user who has no special knowledge can obtain image data that has undergone unsharp masking using an optimum smoothing filter and emphasis coefficient table only by executing a simple operation of designating the enlargement ratio. The unsharp masking uses a smoothing filter and emphasis coefficient table suitable for the image data IA (=E(Ia)) obtained by enlarging the original image Ia. Hence, the generated image data that has undergone unsharp masking can have a high quality while suppressing noise.

Second Embodiment

In the second embodiment, unsharp masking is executed in accordance with equation (4). Both the apparatus arrangement and the UI (User Interface) are common. Details of the process in step S6 in FIG. 8 will be described.

Figure 9:
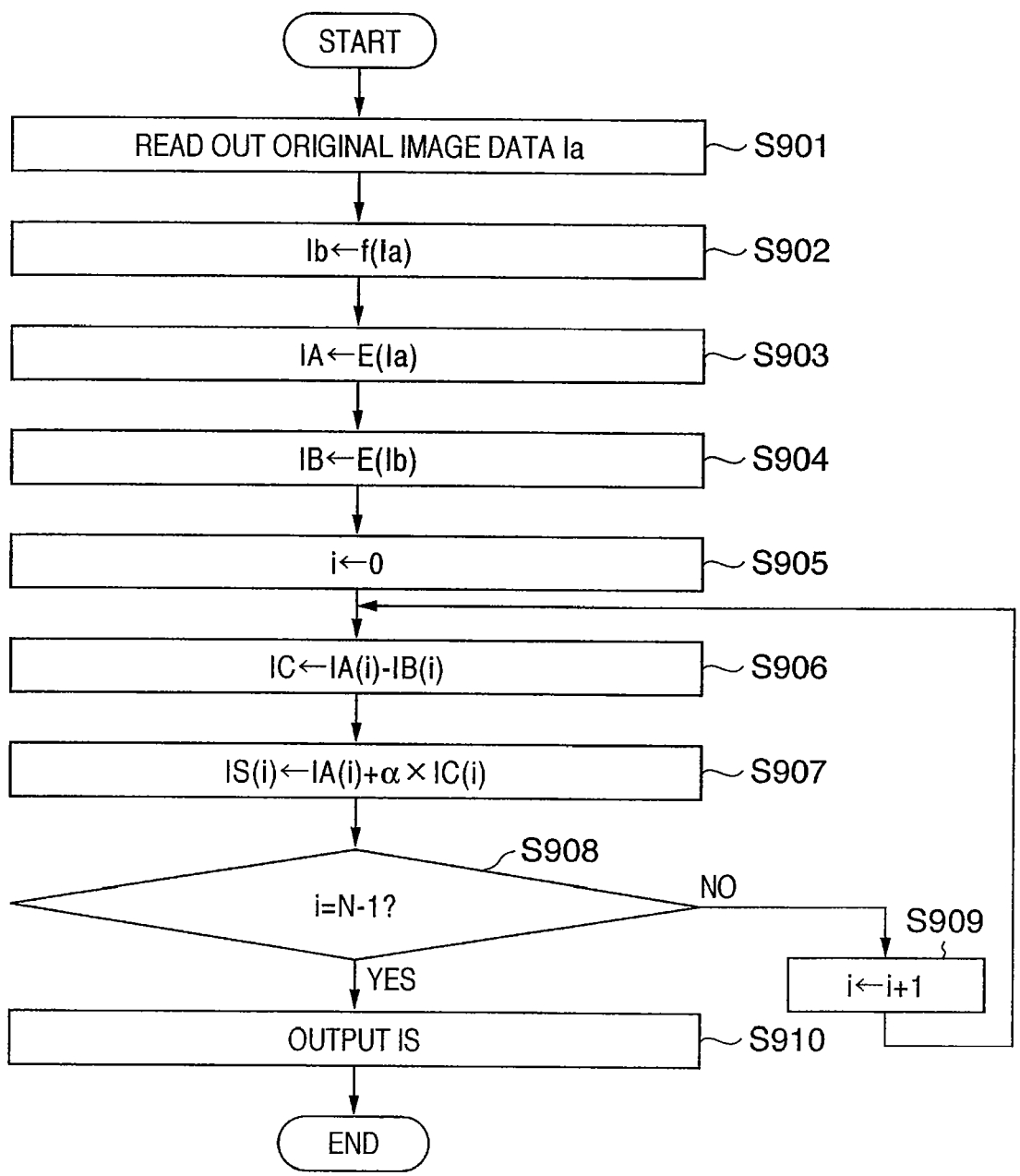
FIG. 9 is a flowchart illustrating the process procedure of enlargement/unsharp masking according to the second embodiment.

FIG. 9 is a flowchart illustrating details of the above-described process in step S6 in FIG. 8 in the second embodiment. Note that an enlargement ratio E has already been set when advancing to step S6, as described above.

In step S901, original image data Ia (image data selected in step S2 in FIG. 8) is read out. In step S902, smoothed image data Ib is obtained by using a smoothing filter f corresponding to the resolution or size of the readout image data Ia. A RAM 106 temporarily stores the generated smoothed image data Ib. The generated smoothed image data Ib corresponds to f(Ia) of equation (4).

In step S903, the original image Ia is enlarged in accordance with the enlargement ratio E to obtain enlarged image data IA. The enlargement in step S903 can be done by either a bi-cubic method or a bi-linear method. In this embodiment, to leave the edge of the original image Ia, enlargement is executed by a bi-cubic method.

In step S904, the smoothed image data Ib is enlarged in accordance with the enlargement ratio E to obtain enlarged smoothed image data IB. The enlargement in step S904 can also be done by either a bi-cubic method or a bi-linear method. In this embodiment, since the enlargement target is a smoothed image, enlargement is executed by a bi-linear method.

The RAM 106 temporarily stores the enlarged image data IA and enlarged smoothed image data IB. The image data IA corresponds to (E(Ia) of equation (4). The enlarged smoothed image data IB corresponds to (f(Ia)).

The process advances to step S905 to initialize a variable i representing a process target pixel position to "0". The meaning of the variable i is the same as in the first embodiment.

In step S906, a difference value IC between the ith pixel value of the image data IA and that of the image data IB is calculated, as in step S507 of the first embodiment. Let IA(i) be the ith pixel value of the image data IA $$IC(i)=IA(i)-IB(i)$$

The process advances to step S907 to calculate the ith pixel value of image data IS that has undergone unsharp masking by using an emphasis coefficient α of an emphasis coefficient filer corresponding to the smoothing filter f of the original image Ia. The calculated pixel value IS(i) is stored at the ith address position of the area allocated in the RAM 106.

$$IS(i)=IA(i)+\alpha \times IC(i)$$

In step S908, the variable i is compared with (N−1) to determine whether unsharp masking is executed for all pixels. If NO In step S908, the process advances to step S909 to increment the variable i by "1", and the process from step S906 is repeated.

If it is determined that unsharp masking is ended for all pixels, the process advances to step S910 to output the image data IS that has undergone unsharp masking and has been generated in the RAM 106 to an image display area 702 in FIG. 7. When a save instruction (not shown) is designated on the application, the image data IS generated in the RAM 106 is saved in a storage device 103 as a file, as in the first embodiment.

As described above, according to the second embodiment, the same functions and effects as in the first embodiment can be obtained. According to the second embodiment, smoothing using the smoothing filter f is executed for the original image data Ia before enlargement. Since the number of process target pixels is small, the process can speed up as compared to the first embodiment. In the second embodiment, two kinds of enlargement methods, i.e., a bi-linear method and a bi-cubic method are adaptively used on the basis of the properties of an image, thereby further suppressing degradation in image quality.

Third Embodiment

In the third embodiment, unsharp masking is executed in accordance with equation (5). Both the apparatus arrangement and the UI (User Interface) are common. Details of the process in step S6 in FIG. 8 will be described.

Figure 10:
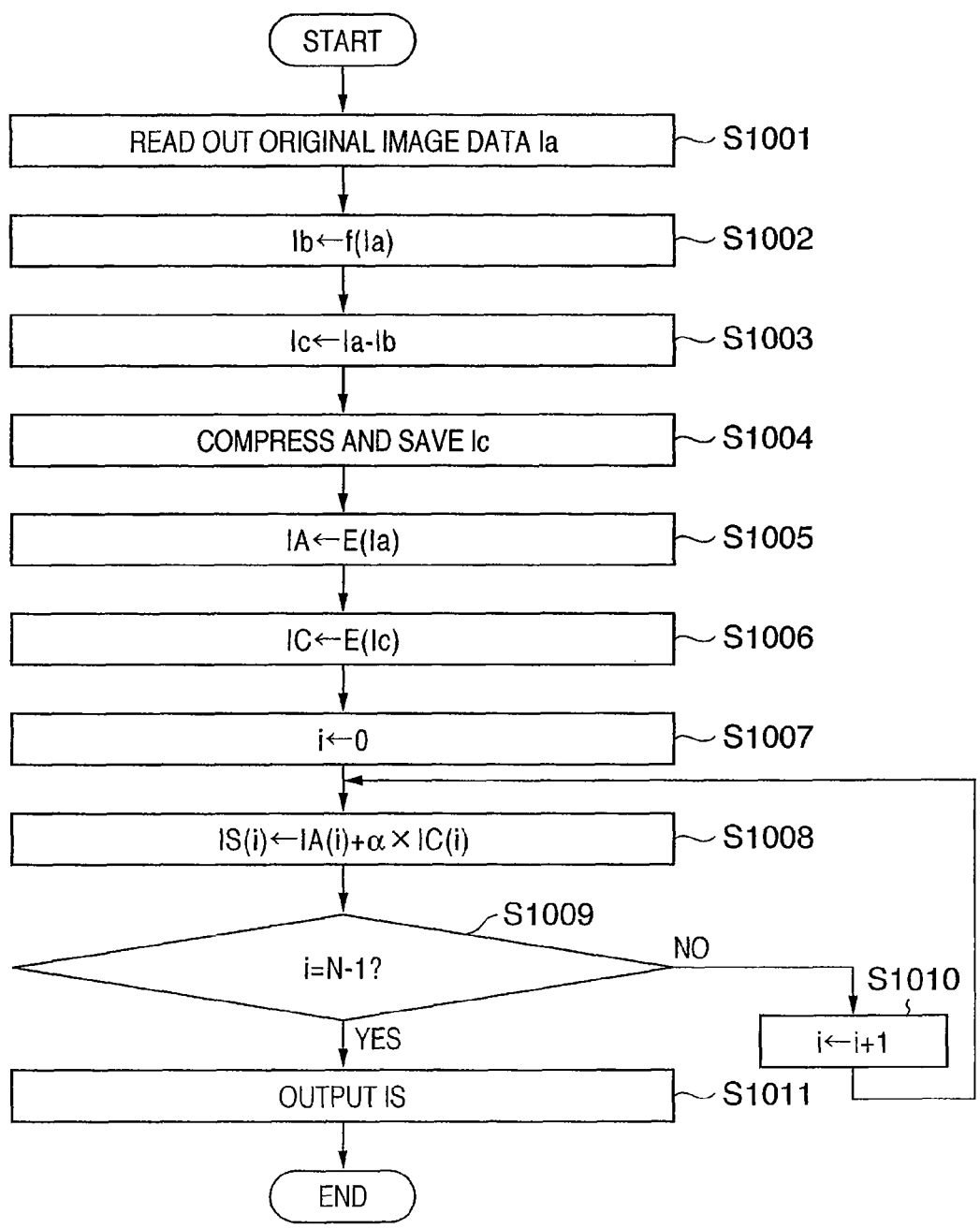
FIG. 10 is a flowchart illustrating the process procedure of enlargement/unsharp masking according to the third embodiment.

FIG. 10 is a flowchart illustrating details of the above-described process in step S6 in FIG. 8 in the third embodiment. Note that an enlargement ratio E has already been set when advancing to step S6, as described above.

In step S1001, original image data Ia (image data selected in step S2 in FIG. 8) is read out. In step S1002, smoothed image data Ib is obtained by using a smoothing filter f corresponding to the resolution or size of the readout image data Ia. A RAM 106 temporarily stores the generated smoothed image data Ib. The generated smoothed image data Ib corresponds to f(Ia) of equation (5).

In step S1003, difference image data Ic between the original image data Ia and the smoothed image data Ib is calculated. The difference image data Ic corresponds to (Ia−f(Ia)) of equation (5).

The process advances to step S1004 to compress the difference image Ic by using lossless compression coding such as ZIP and save it in a storage device 103. At this time, an area in the RAM 106 that stores the generated smoothed image data Ib is released.

The process advances to step S1005 to enlarge the original image data Ia in accordance with the enlargement ratio E. The enlargement is executed by a bi-cubic method, as in the second embodiment.

In step S1006, the saved compressed difference image data Ic is read out and decompressed to obtain the difference image data Ic. The difference image data Ic is enlarged in accordance with the enlargement ratio E to obtain enlarged difference image data IC. The enlarged difference image data IC corresponds to E(Ia−f(Ia)) of equation (5). This enlargement is also executed by a bi-cubic method.

In step S1007, a variable i representing a process target pixel position is initialized to "0". The meaning of the variable i is the same as in the first embodiment. An area to store the image data that has undergone unsharp masking is allocated in the RAM 106.

In step S1008, the ith pixel value of image data IS that has undergone unsharp masking is calculated by using an emphasis coefficient α of an emphasis coefficient filer corresponding to the smoothing filter f of the original image Ia. The calculated pixel value IS(i) is stored at the ith address position of the area allocated in the RAM 106.

$$IS(i)=IA(i)+\alpha \times IC(i)$$

In step S1009, the variable i is compared with (N−1) to determine whether unsharp masking is executed for all pixels. If NO in step S1009, the process advances to step S1010 to increment the variable i by "1", and the process from step S1008 is repeated.

If it is determined that unsharp masking is ended for all pixels, the process advances to step S1011 to output the image data IS that has undergone unsharp masking and has been generated in the RAM 106 to an image display area 702 in FIG. 7. When a save instruction (not shown) is designated on the application, the image data IS generated in the RAM 106 is saved in the storage device 103 as a file, as in the first embodiment.

As described above, according to the third embodiment, the same functions and effects as in the second embodiment can be obtained. According to the third embodiment, the loop process in steps S1008 to S1010 is more simple than that in step S906 to S909 of the second embodiment. Hence, the process can speed up.

Fourth Embodiment

In the above-described first to third embodiments, the number of image data generated by the process changes. That is, it is very effective to not only speed up the process, as described above, but also select an optimum processing method on the basis of the remaining capacity of a RAM 106 (storage device 103 in some cases) serving as the work area in the processing apparatus.

In the fourth embodiment, the processing method of unsharp masking by the above-described three equations is selected on the basis of a hardware configuration, i.e., hardware resources related to the processing power of an image processing apparatus. The consumption amounts of the RAM 106, process times, and image qualities of the three kinds of unsharp masking processing methods are listed below in three steps.

Equation (3) (first embodiment): high memory utilization, long process time, and high image quality.

Equation (4) (second embodiment): medium memory utilization, short process time, and medium image quality.

Equation (5) (third embodiment): low memory utilization, medium process time, and low image quality.

The quality of a finally obtained image that has undergone enlargement/unsharp masking is highest in the process by equation (3), and equations (4) and (5) follow in this order. The hardware resources include the usable memory size of the RAM 106 and the processing power of a CPU 104.

Not the total capacity but the usable memory size of the RAM 106 is included in the hardware resources because a PC can normally execute a plurality of applications, and the free space of the memory changes depending on the types and number of applications that are being executed. However, it may be the total capacity of the RAM 106 in an environment incapable of executing many unspecified applications.

The processing power of the CPU 104 is determined by the type of the CPU and its operation clock.

Information about the free space of the RAM 106 and the processing power of the CPU 104 can easily be acquired by using, e.g., the function call of the OS (Operating System), and a detailed description thereof will be omitted there.

In the fourth embodiment, the usable memory size of the RAM 106 is compared with two preset threshold values to determine the level of the usable memory size, i.e., large, medium, or small.

The processing power of the CPU 104 is also compared with two preset threshold values to determine the level of the processing power of the CPU 104, i.e., high, medium, or low.

On the basis of the usable memory size of the RAM 106 and the processing power of the CPU 104, the index value (large, medium, or small) of the hardware resources of the apparatus that executes an application in the fourth embodiment is determined.

FIG. 15 shows a table for hardware resource determination.

As shown in FIG. 15, when both the processing power of the CPU and the usable memory size are medium or more, the hardware resources are determined to be large. If the usable memory size is small, the hardware resources are determined to be small. Otherwise, the hardware resources are determined to be medium.

When the hardware resources are large, enlargement/unsharp masking is executed in accordance with equation (3), i.e., the first embodiment. When the hardware resources are medium, enlargement/unsharp masking is executed in accordance with equation (4), i.e., the second embodiment. When the hardware resources are small, enlargement/unsharp masking is executed in accordance with equation (5), i.e., the third embodiment.

Figure 16:
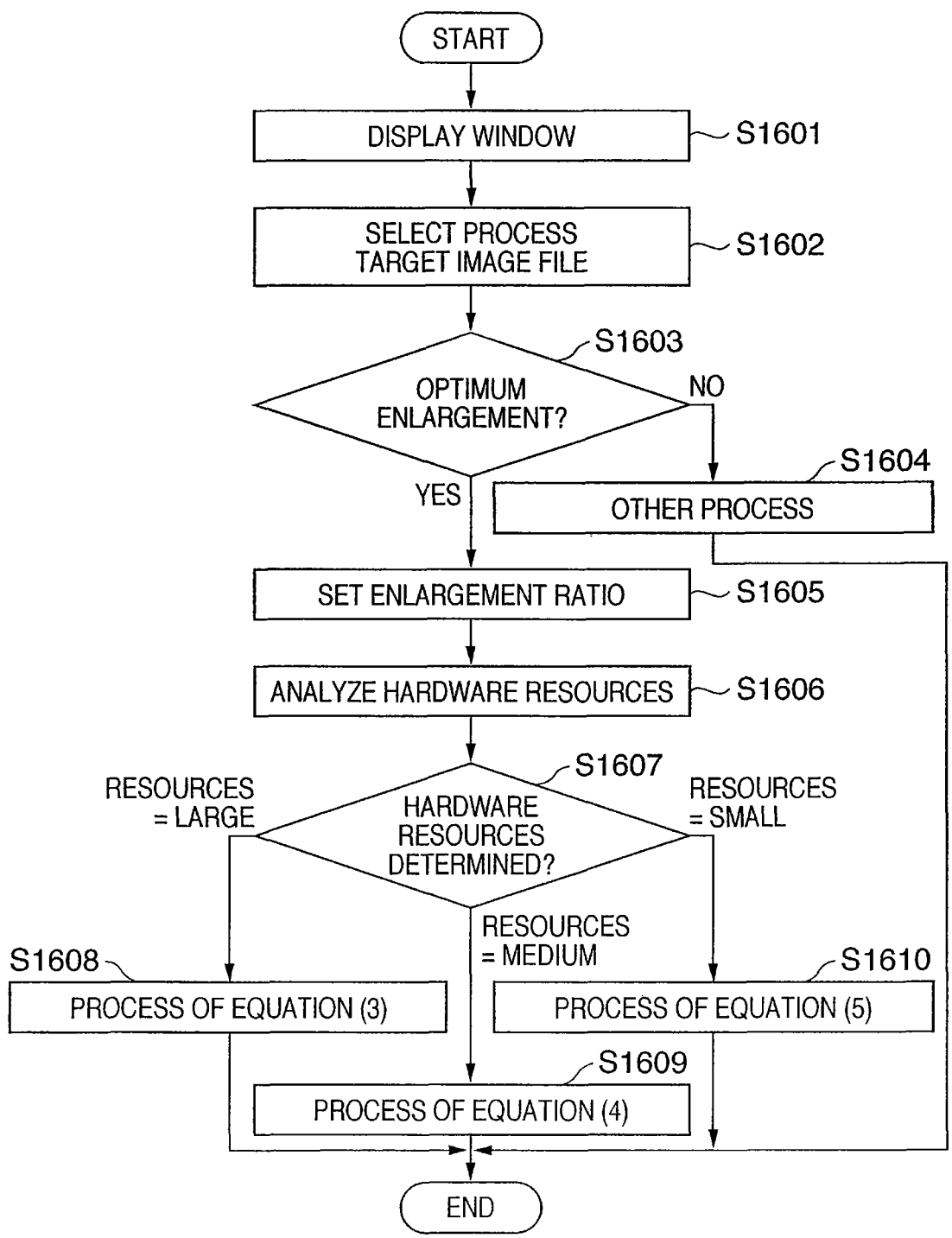
FIG. 16 is a flowchart illustrating the main process of the fourth embodiment.

FIG. 16 illustrates an example of the main process of the fourth embodiment. The main process in FIG. 16 replaces FIG. 8.

The CPU 104 displays the window shown in FIG. 7 in step S1601 and waits until the user selects an editing target image file in step S1602. To select an image file, a dialog box for file selection is displayed. The user designates a target file from an input device 101. When the user selects a file, the image is displayed in an image display area 702. In step S1603, the CPU 104 waits an editing instruction from the user. If the CPU 104 determines that the user's edit instruction is not an optimum enlargement button 705, the process advances to step S1604 to execute a corresponding process.

If the CPU 104 determines that the user's edit instruction is the optimum enlargement button 705, the process advances to step S1605 to display a dialog box 707 for enlargement ratio setting and cause the user to set an enlargement ratio. After enlargement ratio setting, if the user designates the OK button in the dialog box 707, the process advances to step S1606. In step S1606, the CPU 104 analyzes the processing power of its own and the usable memory size in the RAM 106 and obtains the index value of the hardware resources by looking up the table in FIG. 15. In step S1607, the CPU 104 determines the obtained index value.

If the index value of the hardware resources is "large", the process advances to step S1608 to execute a process in accordance with equation (3), i.e., the flowchart in FIG. 5. If the index value of the hardware resources is "medium", the process advances to step S1609 to execute a process in accordance with equation (4), i.e., the flowchart in FIG. 9. If the index value of the hardware resources is "small", the process advances to step S1610 to execute a process in accordance with equation (5), i.e., the flowchart in FIG. 10.

As described above, according to the fourth embodiment, it is possible to execute enlargement/unsharp masking adaptively in accordance with one of equations (3) to (5) on the basis of the hardware resources of the apparatus that executes the image editing application of the fourth embodiment.

Fifth Embodiment

In the fourth embodiment, enlargement/unsharp masking is executed adaptively in accordance with one of equations (3) to (5) on the basis of the hardware resources of the apparatus.

However, a user who owns an apparatus with poor hardware resources may desire to do enlargement/unsharp masking to ensure the highest image quality at the expense of time.

As shown in FIG. 17, an optimum enlargement process setting menu may be displayed to cause the user to select "auto" or "manual". Radio buttons are prepared, as shown in FIG. 17. The user explicitly selects one of "auto" and "manual". When the user sets "auto", the process of the fourth embodiment is done.

When the user selects "manual", he/she manipulates the slider bar to explicitly set one of the processes of the first to third embodiments.

The setting contents are saved in, e.g., an environment file to reflect them on the next editing.

With the above-described process, the user can select a process from the first to fourth embodiments, resulting in an increase in convenience for the user.

Other Embodiments

The four embodiments of the present invention have been described above. As described in the embodiments, the present invention can be implemented by a computer program. Hence, the present invention also incorporates such a computer program.

The present invention is also applicable to a system including a plurality of devices (e.g., host computer, interface device, reader, and printer) or an apparatus (e.g., copying machine or facsimile apparatus) including a single device.

Normally, a computer program is stored in a computer-readable storage medium such as a CD-ROM. The computer program becomes executable when the storage medium is set in the read device (CD-ROM drive) of a computer and copied or installed in the system. Hence, the present invention also incorporates such a computer-readable storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-207168, filed Jul. 28, 2006, which is hereby incorporated by reference herein in its entirety.

What is claimed is:

1. An image processing apparatus which generates enlarged image data by increasing the number of pixels of original image data in accordance with an enlargement ratio, characterized by comprising:
    an enlargement ratio setting unit adapted to set the enlargement ratio;
    an image enlargement unit adapted to enlarge given image data in accordance with the set enlargement ratio;
    a smoothing unit adapted to smooth the given image data by using a set smoothing filter;
    a determination unit adapted to determine a level of a processing power indicated by hardware resources of the apparatus, wherein the level of the processing power is at least one of the group consisting of: a preset first level, second level, or third level; and
    a control unit adapted to control said image enlargement unit and said smoothing unit to enlarge the original image data in accordance with the enlargement ratio set by said enlargement ratio setting unit on the basis of a determination result of said determination unit,
    wherein letting
    Ia be the original image data
    E(x) be image data obtained when said image enlargement unit enlarges image data x,
    f(x) be image data obtained when said smoothing unit smoothes the image data x,
    − be a difference between pixels at the same position of two image data, and + be a sum,
    α be an emphasis coefficient, and
    IS be enlarged image data to be obtained,
    when said determination unit determines that the processing power belong to the third level, said control unit executes a process according to $$IS=E(Ia)+\alpha\cdot(E(Ia)-f(E(Ia))$$

when said determination unit determines that the processing power belong to the second level, said control unit executes a process according to $$IS=E(Ia)+\alpha\cdot(E(Ia)-E(f(Ia)), \text{ and}$$

when said determination unit determines that the processing power belong to the first level, said control unit executes a process according to $$IS=E(Ia)+\alpha\cdot E(Ia-f(Ia)).$$

2. The apparatus according to claim 1, characterized in that when said determination unit determines that the processing power belong to the third level, said smoothing unit executes smoothing by using a smoothing filter having a size depending on the enlargement ratio.

3. A control method of an image processing apparatus which generates enlarged image data by increasing the number of pixels of original image data in accordance with an enlargement ratio, characterized by comprising the steps of:
    setting the enlargement ratio;
    enlarging given image data in accordance with the set enlargement ratio;

smoothing the given image data by using a set smoothing filter;

determining a level of a processing power indicated by hardware resources of the apparatus, wherein the level of the processing power is at least one of the group consisting of: a preset first level, second level, or third level; and controlling the image enlarging step and the smoothing step to enlarge the original image data in accordance with the enlargement ratio set in the enlargement ratio setting step on the basis of a determination result in the determining step, wherein letting Ia be the original image data E(x) be image data obtained when the image enlargement step enlarges image data x, f(x) be image data obtained when the smoothing step smoothes the image data x, − be a difference between pixels at the same position of two image data, and + be a sum, α be an emphasis coefficient, and IS be enlarged image data to be obtained, when it is determined in the determining step that the processing power belong to the third level, a process is executed in the control step according to $$IS=E(Ia)+\alpha \cdot (E(Ia)-f(E(Ia))$$

when it is determined in the determining step that the processing power belong to the second level, a process is executed in the control step according to $$IS=E(Ia)+\alpha \cdot (E(Ia)-E(f(Ia)), \text{ and}$$

when it is determined in the determining step that the processing power belong to the first level, a process is executed in the control step according to $$IS=E(Ia)+\alpha \cdot E(Ia-f(Ia)).$$

4. A non-transitory computer-readable storage medium storing a computer program that by being read in and executed by a computer functions as control method of an image processing apparatus which generates enlarged image data by increasing the number of pixels of original image data in accordance with an enlargement ratio, the control method characterized by comprising the steps of:

setting the enlargement ratio;

enlarging given image data in accordance with the set enlargement ratio;

smoothing the given image data by using a set smoothing filter;

determining a level of a processing power indicated by hardware resources of the apparatus, wherein the level of the processing power is at least one of the group consisting of:

a preset first level, second level, or third level; and controlling the image enlarging step and the smoothing step to enlarge the original image data in accordance with the enlargement ratio set in the enlargement ratio setting step on the basis of a determination result in the determining step, wherein letting Ia be the original image data E(x) be image data obtained when the image enlargement step enlarges image data x, f(x) be image data obtained when the smoothing step smoothes the image data x, − be a difference between pixels at the same position of two image data, and + be a sum, α be an emphasis coefficient, and IS be enlarged image data to be obtained, when it is determined in the determining step that the processing power belong to the third level, a process is executed in the control step according to $$IS=E(Ia)+\alpha \cdot (E(Ia)-f(E(Ia))$$

when it is determined in the determining step that the processing power belong to the second level, a process is executed in the control step according to $$IS=E(Ia)+\alpha \cdot (E(Ia)-E(f(Ia)), \text{ and}$$

when it is determined in the determining step that the processing power belong to the first level, a process is executed in the control step according to $$IS=E(Ia)+\alpha \cdot E(Ia-f(Ia))$$

.

* * * * *